United States Patent
Dusoulier et al.

(10) Patent No.: US 9,296,647 B2
(45) Date of Patent: Mar. 29, 2016

(54) HIGH REFLECTION GLASS PANEL

(75) Inventors: Laurent Dusoulier, Jumet (BE); Dominique Coster, Jumet (BE)

(73) Assignee: AGC Glass Europe, Brussels (BE)

( * ) Notice: Subject to any disclaimer, the term of this patent is extended or adjusted under 35 U.S.C. 154(b) by 645 days.

(21) Appl. No.: 13/576,301

(22) PCT Filed: Mar. 9, 2011

(86) PCT No.: PCT/EP2011/053520
§ 371 (c)(1), (2), (4) Date: Jul. 31, 2012

(87) PCT Pub. No.: WO2011/110584
PCT Pub. Date: Sep. 15, 2011

(65) Prior Publication Data
US 2012/0301692 A1   Nov. 29, 2012

(30) Foreign Application Priority Data

Mar. 10, 2010  (BE) .................................... 2010/157

(51) Int. Cl.
B32B 7/02     (2006.01)
C03C 17/34    (2006.01)
C03C 23/00    (2006.01)

(52) U.S. Cl.
CPC ........... *C03C 17/3417* (2013.01); *C03C 23/007* (2013.01); *C03C 2218/154* (2013.01); *Y10T 428/24967* (2015.01); *Y10T 428/266* (2015.01)

(58) Field of Classification Search
CPC .......................... C03C 17/3417; C03C 23/007
USPC ........................... 428/212, 215, 337; 359/838
See application file for complete search history.

(56) References Cited

U.S. PATENT DOCUMENTS

| 6,436,542 B1 | 8/2002 | Ogino et al. |
|---|---|---|
| 2001/0031365 A1 | 10/2001 | Anderson et al. |
| 2003/0143401 A1 | 7/2003 | Hukari et al. |
| 2005/0260419 A1 | 11/2005 | Hukari et al. |
| 2008/0085404 A1* | 4/2008 | Novis et al. ................... 428/212 |
| 2009/0162695 A1* | 6/2009 | Hevesi et al. ................. 428/698 |
| 2010/0266823 A1 | 10/2010 | Hukari et al. |
| 2011/0008641 A1 | 1/2011 | Di Stefano |

FOREIGN PATENT DOCUMENTS

| EP | 1 068 899 | 1/2001 |
|---|---|---|
| FR | 2 793 889 | 11/2000 |
| WO | 2009 115596 | 9/2009 |
| WO | 2010 031808 | 3/2010 |

OTHER PUBLICATIONS

International Search Report Issued Apr. 27, 2011 in PCT/EP11/053520 Filed Mar. 9, 2011.

* cited by examiner

*Primary Examiner* — Aaron Austin
*Assistant Examiner* — Lawrence Ferguson
(74) *Attorney, Agent, or Firm* — Oblon, McClelland, Maier & Neustadt, L.L.P.

(57) ABSTRACT

The invention relates to a glass panel including at least two layers deposited by cathode sputtering, including at least one layer of a metal oxide, suboxide, nitride or oxynitride having a refractive index which is not lower than 2.2 and, stacked directly or indirectly on top of said layer, at least one layer consisting of mixed oxides of titanium and at least one other metal, said mixed oxides having a weight proportion of titanium oxide which is not less than 40% and not greater than 95%, the thickness of the layer in question and that of the other layer(s) having a refractive index greater than 2.2 being selected such that, on a 4-mm thick sheet of clear "float" glass, said layer(s) result(s) in a reflection of at least 15% and a light transmission of at least 60%, the layer or system of layers in question further having a mechanical and/or chemical resistance comparable to those of layers produced by pyrolysis for obtaining products having the same type of optical properties.

20 Claims, 1 Drawing Sheet

HIGH REFLECTION GLASS PANEL

Figure 1:
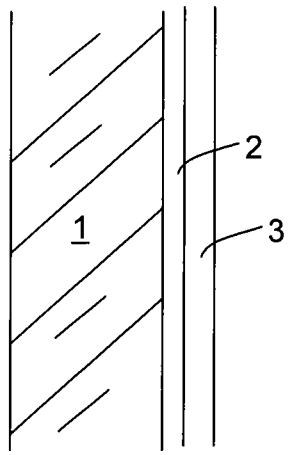

The present invention relates to glazings which have a high reflection in the visible range while retaining a significant portion of transmission.

The glazings in question are useful in particular for limiting the natural energy gain especially in buildings exposed to a lot of sunshine. The limitation of the energy gain makes it possible to economize on the need for air conditioning. The glazings in question are also characterized by their "solar factor", a measurable quantity denoting the ratio of the energy both transmitted through the glazing and reemitted by the latter toward the inside, after absorption, to the total incident energy.

Glazings of this type are usually constituted by coating the glass sheet with a layer, or with a system of layers said to be "hard". These layers are conventionally deposited by pyrolysis on the hot glass immediately after formation of the sheet. Most common is to carry out the pyrolysis "in-line", that is to say on the same glass production site. The glass ribbon constituted on the "float" line is coated while it is still at high temperature.

One recognized distinctive feature of products obtained by pyrolysis is that they are relatively hard. They withstand well both chemical and mechanical attacks. For this reason they are conveniently used, optionally by exposing the coated face to external hazards. This distinctive feature distinguishes the layers obtained by pyrolysis from those produced by sputtering vacuum deposition techniques, these two types of techniques constituting the two most widely used routes for producing thin layers on a glass support.

In contrast, the layers obtained by vacuum sputtering are said to be "soft". Their insufficient mechanical or chemical resistance means that these layers are mainly used in configurations where they are not exposed to these attacks. This is the case in multiple glazings. In these glazings, the layers are turned toward the spaces located between the sheets.

Although the use of pyrolytic layers is technically satisfactory, it is however closely linked to the availability of suitable specific precursors. The precursors available do not make it possible to produce all of the attainable layers. Moreover, the use of pyrolysis techniques requires the presence of specific, very expensive facilities that must be integrated into production lines which, by nature and economies of scale, are inevitably limited in number and therefore geographically distributed in a discrete manner over the territories for which these products are intended.

The facilities for coating by vacuum sputtering are independent of that of manufacture of the glass. The coating operations via these techniques are carried out "off-line" according to the standard terminology, in other words on glass which has been manufactured previously and which in the meantime may have been stored, transported, re-cut, etc.

For logistical reasons in particular, the possibility of providing glazings coated by sputtering that offer the qualities of products obtained by pyrolysis is one objective of the invention. It is obviously necessary that the production cost of these glazings remains comparable to that of glazings coated by pyrolysis.

Layers deposited by vacuum sputtering and which result in advantageous solar factors are known. This is in particular the case for layers of titanium oxide. These layers display however, as indicated previously, an insufficient mechanical resistance in order to be able to be used, apart from on the unexposed faces of the glazings considered.

The inventors have shown that a very specific choice of the materials constituting these layers deposited by sputtering made it possible to attain the resistance requirements indicated. The inventors have also shown that, via a suitable choice of the systems of layers, it is also possible to subject the glazings in question to powerful subsequent heat treatments, such as bending or tempering treatments without however adversely affecting the essential characteristics conferred by these layers.

The systems of layers, considered according to the invention, do not contain any infrared-reflecting metal-type layers, especially silver-based layers, the systems comprising these silver-based layers systematically displaying a certain weakness with respect to external attacks.

The objective of the invention is to provide glazings responding to the requirements stated above.

The inventors have shown that this objective could be achieved by glazings as defined in claim 1. It is noteworthy that the layers comprising titanium oxide combined with other oxides make it possible to achieve the desired characteristics, especially of resistance, whereas layers of titanium oxide alone, as indicated previously, are not strong enough. Furthermore, the reflective properties characteristic of the titanium oxide may be maintained to a large extent by combining the layer having a good mechanical resistance with one or more layers having a high refractive index.

The reasons for the quality of the layers based on titanium oxide that are used according to the invention are not fully elucidated. It is likely that the fact of depositing a layer composed of a mixed oxide of titanium and another metal results in a modification of the structure of the layer. The formation of the crystals is certainly modified. The presence of two or more constituents, the crystallographic characteristics of which are not the same, leads to a very specific growth, probably while avoiding in particular the formation of more brittle structures such as columns.

A certain variety of oxides is capable of being combined with the titanium oxide in this mixed oxide layer. Among the oxides that can be used are in particular those of the following compounds: Al, Zr, Hf, Nb, V, Ta, Mn, Fe, Co, Ni, Cu, Si. Among these, preferred oxides are especially those of Al, Zr, Hf, Nb and very particularly the oxide of Zr.

The mixed oxides used according to the invention are mixed oxides of Ti and of another of the elements indicated above. However, one or more elements are often added thereto in limited proportions, in general of less than 8% by weight and usually less than 5%. These are in particular dopants, the role of which is mainly to improve the manufacture and/or use of the cathodes in the production of the layers in vacuum deposition techniques. Conventionally, these elements are intended, in particular, to improve the conductivity of the materials constituting cathodes such as: Ti, Al. They may also be compounds that stabilize certain constituents such as Ca, Mg, or else elements that appear to be indissociable from others during the preparation. This is the case for lanthanides such as yttrium oxide or hafnium oxide.

Particularly advantageously, the zirconium oxide included in the mixed oxide layer based on titanium oxide is present in a proportion of 25% to 60% by weight and preferably of 40% to 55%. Zirconium oxide is particularly advantageous insofar as, in addition to conferring the desired resistance properties, since its refractive index is close to that of titanium oxide, the optical properties of the coated glazings, and especially the reflection, are as close to those that are observed with titanium oxide.

The resistance of the layer based on titanium oxide depends on its composition, it also depends on its thickness. Although an increase in thickness is accompanied by increased resistance, beyond a certain threshold the improvement is not significant, the additional cost for a thicker deposition becomes pointless.

Preferably, the layer based on titanium oxide according to the invention has a thickness between 25 and 900 Å, preferably between 50 and 500 Å, and advantageously from 100 to 350 Å.

The choice of the thickness of the layer based on titanium oxide also depends on other layers having a high refractive index. These thicknesses are such that the conditions regarding the reflection are satisfactory. For the glazings according to the invention, generally the reflection is at least 15% when the system of layers is applied to clear glass with a thickness of 4 mm. Under the same conditions, it is advantageously between 20% and 40%.

The layer of mixed oxide based on titanium oxide, in the system of layers in which it is included, and in particular its refractive index, contributes to the reflection but also to the other optical quantities obtained, especially the light transmission. For the glazings according to the invention, the light transmission is preferably at least 60%. The light absorbed by the glazing remains relatively low. It is advantageously less than 20% and preferably less than 10%.

The reflection in the systems of layers according to the invention depends partly on the layer of mixed oxide based on titanium oxide but also on the subjacent high-index layer(s). One particularly preferred high-index layer is a titanium oxide layer. By way of indication, the layers comprising in combination titanium and zirconium oxides (50% titanium oxide, 46% by weight zirconium oxide, the remainder being yttrium oxide) deposited under vacuum have an index of the order of 2.35. The layers of $TiO_2$, whether stoichiometric or not—the latter customarily denoted by TXO—which layers may especially be obtained by using ceramic cathodes, have an index of the order of 2.45-2.50. The combination of a layer of $TiO_2$ or TXO, or else a layer of titanium oxynitride containing a low content of nitrogen (N/O atomic ratio of less than 10%), with a layer of mixed oxide based on titanium oxide therefore makes it possible to simultaneously benefit from a good resistance conferred by the latter layer, and overall from a higher index.

In the glazings according to the invention, the layers having a high refractive index (of greater than 2.2) and the layers of mixed oxide based on titanium oxide may be combined with other layers in order to improve the properties thereof or to confer properties thereon that the first ones would not have or would not have to a suitable degree for the envisaged use.

The use of glazings according to the invention may take place with no other modification than cutting to the desired dimensions and introducing into frames. The glazings in question in this case are essentially flat. The need for cutting to the dimensions after the coating, means that the glass sheets being incorporated into the composition of these glazings are not first subjected to a heat treatment. The heat treatments in question, by ensuring the presence of stresses, give the glazings mechanical properties that ensure both a better impact resistance and above all, in the case of a violent impact, means that these glazings break into multiple fragments of small dimensions.

When it is desired to have glazings that are either curved or tempered, it is necessary to undergo a high-temperature heat treatment after the application of the layers. These treatments take the glazings to temperatures which exceed 550° C. and often 600° C., for a relatively long time. In the case of curving or bending, the transformation may thus make it necessary to hold these temperatures for several minutes considering, in particular, the thermal inertia of the glass. The hold time at these temperatures may reach 5 minutes or more depending on the techniques used and the thickness of the sheets treated.

Heat treatments of tempering or bending type are known for being capable of adversely affecting the thin layers deposited on the glass sheets. Independently of the adverse changes which may appear in the structure of certain layers due to the very reason of the temperature, the glass substrate may also induce undesirable modifications.

Overall, the layers considered according to the invention do not undergo a prejudicial structural change under the conditions of these heat treatments. The structure of the layers remains substantially unchanged. But the sheets of soda-lime-silica type glass, in other words the most common glasses, subjected to high temperatures may result in an adverse change of the layers with which they are coated. At the temperatures considered, the alkali metal constituents of these glasses are capable of migrating and of diffusing into the layers in contact with the glass. The diffusion of these mobile elements often leads to the appearance of a more or less pronounced haze.

The appearance of haze corresponds to a mechanism of light scattering due to the presence of foreign elements in the structure of the layers.

In practice, the products used must be highly transparent. The proportion of scattered light relative to the transmitted light must not exceed 2% and preferably must not exceed 1%. These limits may be exceeded if no precaution is taken in order to protect the layers used according to the invention.

In order to prevent diffusion phenomena, especially diffusion of the alkali metal ions of the glass, it is known to have layers that oppose the passage of these ions, which layers are interposed between the substrate and the layer or layers to be protected. Protective layers of this type are, in particular, $SiO_2$ layers. Although the barrier quality of $SiO_2$ layers is well known, their production by sputtering remains relatively expensive. Insofar as it is desirable to deposit all of the layers in the same manner and in a single pass, it may be preferable to substitute, for the silica layers, layers that have similar properties but that are easier to produce.

Preferred "barrier" sublayers used for improving the protection against the diffusion of alkali metal ions from the glass sheet are, for example, constituted of at least one of the following silicon compounds: oxide ($SiO_2$), nitride ($Si_3N_4$) or oxynitride (SiON); or oxides of $SnO_2$ and oxides composed of tin and zinc, or else $TiO_2$, optionally substoichiometric or optionally in the form of oxynitride containing a low content of nitrogen (N/O of less than 10%).

When a layer based on tin oxide is used, it comprises at least 30% and preferably at least 40% by weight of tin oxide.

The layer based on tin oxide is preferably a mixed zinc tin oxide layer. The combination of the two offers the advantage, in addition to a high deposition rate by sputtering techniques, of resulting in layers, the structure of which is very stable under the heat treatments considered.

Zinc oxide alone is not desirable as a layer that blocks the diffusion due to its tendency to constitute columnar structures, in particular when its thickness exceeds about 10 nanometers, which structures are not very effective against diffusion phenomena.

The mixed zinc tin oxides prevent the formation of columnar structures as long as the tin content remains sufficient.

The presence of a layer that blocks the diffusion of the constituents of the glass modifies the optical properties of the glazing. In particular, the presence of a layer based on tin oxide, the refractive index of which is lower than that of the layer based on titanium oxide, modifies the reflection.

So as not to excessively reduce the reflection of the glazing, it is preferable to be sure, when a layer based on tin oxide is used, to correctly adapt its thickness. The latter is preferably less than 1.2 times the combined thickness of the layer having a high refractive index and of the mixed oxide layer based on titanium oxide.

The layer or systems of layers used according to the invention must also result in glazings for which the coloring induced by these layers meets the demand of the market. Certain colorations, especially in reflection, must be eliminated. This is the case, in particular, for overall "purple" colorations. These colorations have, when analyzed in the CIE (International Commission on Illumination) system the parameters a* and b* which advantageously correspond to the following conditions: for an illuminant D and for a solid angle of 10° at most a*≤0 and b ≤6. It is particularly important to systematically have a non-positive a*. For the negative values of a*, the coloration is either slightly blue or slightly green. These colorations in reflection are acceptable even though the preference is color neutrality.

It is also preferable, in the case of a heat treatment, that the latter does not lead to a significant modification of the coloration in reflection. When the products offer substantially the same colorations it is possible to use, in one and the same assembly, products that are for example curved and other products which are not curved, with no difference in appearance. The products can be juxtaposed without detracting from the esthetics.

In practice, the more "neutral" the products are, the more their coloration, before and after heat treatment, enables them to be juxtaposed.

In practice, glazings corresponding to these coloration requirements preferably have, before and after heat treatment, variations of a* and b* such that ΔE*≤2 and advantageously ΔE*≤1, with:

$$\Delta E^* = (\Delta a^{*2} + \Delta b^{*2})^{1/2}$$

Apart from the layers that determine the optical characteristics of the glazings according to the invention, and for the purpose of protecting these layers even more against the risks of deterioration in subsequent operations, especially storage and transport operations, it is possible and advantageous to cover these layers with a temporary coating that is removed before the installation of these glazings.

It is known to cover the glazings with various soluble wax or polymer films which can be removed by washing. These products may be used to protect the layers produced according to the invention.

The use of these protective products requires two additional operations on the glazings, the application, on the one hand, and the subsequent washing, on the other hand. In the case of glazings that have to undergo a heat treatment, it is preferable to use a carbon coating, which may be integrated into the sputtering deposition operations, and the removal of which takes place itself during the heat treatment by combustion in contact with the air.

The glazings according to the invention are constituted from glass sheets of various thicknesses. They may also be constituted of sheets of glass that are clear or colored in the bulk, mainly to give them esthetic characteristics, but also optionally to develop their optical-energetic properties.

It is possible to use glasses that are more absorbent than clear glasses, especially gray glasses or glasses that are predominantly slightly blue or green. Preferably, when colored glasses are used, the dominant wavelength in reflection $\lambda_m$ for an illuminant D65 under a solid angle of 2°, is between 475 and 600 nm.

Figure 2:
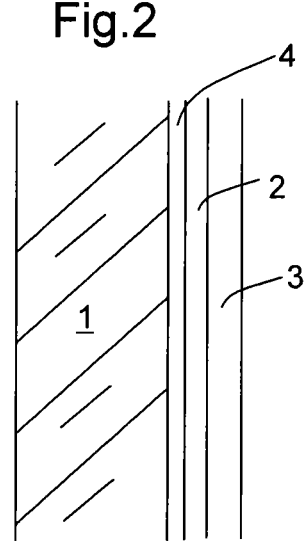
Figure 3:
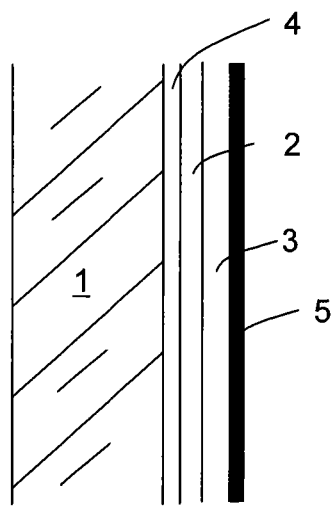

The invention is described in detail below by exemplary embodiments of the invention, where appropriate by referring to the appended drawings in which FIGS. 1 to 3 are schematic representations of glazings according to the invention.

FIG. 1 shows a glazing 1 comprising a system of layers according to the invention. The respective thicknesses are not abided by for the sake of clarity. Layer 2 is a layer having a high refractive index. Layer 3 is a mixed oxide layer based on titanium oxide.

FIG. 2 is a glazing according to the invention similar to the previous one, additionally comprising a layer 4 for protection against the diffusion of constituents of the glass sheet 1.

FIG. 3 represents a glazing according to the invention which, in addition to the preceding layers, comprises a protective coating 5. The coating in question, which is applied temporarily, has the main role of preventing scuffs, scratches and other adverse mechanical changes capable of reaching the functional layers 3. This layer, in the case of glazings that undergo a heat treatment subsequent to the formation of the functional layers, is advantageously constituted of a material which is removed by combustion during this heat treatment. A layer of carbon is particularly advantageous for constituting this coating.

The products according to the invention are analyzed, in particular, for their qualities of mechanical resistance or chemical resistance. The tests to which they are subjected are the same as those which are used for evaluating similar glazings, the functional layers of which are produced by pyrolysis. The glazings according to the invention must attain equivalent performances.

The tests systematically comprise moisture resistance tests (21 days in a climatic chamber), chemical resistance tests (neutral salt spray for 21 days and exposure to $SO_2$ for five cycles), an abrasion resistance test (AWRT for Automatic Wet Rub Test) and a scratch resistance test (DBT for Dry Brush Test). The chemical resistance tests are those described in standard EN 1096-2. The abrasion tests are specific to the tests for layers deposited by "magnetron sputtering". These two tests are substantially more "severe" than the analogous tests described in the standard indicated above. In other words, the abrasion tests that are passed in the examples carried out are inevitably satisfactory under the conditions of this standard.

The test in a climatic chamber consists in exposing the sample in an oven maintained at 40° C.±1.5° C. for 21 days. The test is passed when the sample remains free of marks. The aging under these conditions for each day corresponds to an exposure of one year to standard atmospheric hazards.

The sample must not be faded, nor generally suffer defects of any nature whatsoever, such as detachment of the layer.

The test of resistance to the acid atmosphere is carried out in the following way:

The sample is placed in a chamber charged with an acid atmosphere (two liters of water per 2 liters of $SO_2$) brought to 40° C. for 8 hours. Brought back to ambient temperature, the sample remains in the atmosphere in question for another 16 hours. The same cycle is repeated 4 times. The layer must not be detached.

The wet rub test "AWRT" (automatic wet rub test) is carried out with a circular head of Teflon coated with a cotton fabric (ADSOL ref. 40700004). This is placed under a load of 1050 g on the layer. The cotton is kept wet during the test with demineralized water. The frequency of the oscillations is from 60 to 90 per minute. The samples are observed in order to detect the adverse changes of the layer.

The dry brush test "DBT" is carried out on an Erichsen device (model 494) equipped with a standardized brush (ASTM D2486). Each fiber of the brush has a diameter of 0.3 mm. The fibers are grouped into bundles having a diameter of 4 mm. The total weight applied by the brush and its support is 454 g. The test comprises 1000 back and forth cycles.

The measurements of the optical quantities are carried out according to standard EN 410.

The samples are produced on sheets of clear "float" glass having a thickness of 4 mm. All the samples are systematically analyzed before and after heat treatment at 670° C. for 8 minutes 30 seconds. The samples subjected to this treatment are denoted by (').

EXAMPLES 1, 1', 2 AND 2'

The samples receive a set of layers comprising a layer of tin oxide ($SnO_2$), a layer of titanium oxide deposited from ceramic cathodes (TXO) and a layer of tin zirconium mixed oxide (TZO), constituted of a mixed oxide of 50% by weight of $TiO_2$, 46% of $ZrO_2$, the rest coming from elements that customarily accompany zirconium, in particular yttrium oxide. This layer is also deposited from ceramic cathodes.

The thicknesses of these layers are respectively, in Å:

|   | $SnO_2$ | TXO | TZO |
|---|---|---|---|
| 1 | 100 | 300 | 300 |
| 2 | 50 | 100 | 300 |

The tests of chemical resistance and mechanical resistance and the "haze" are satisfactory before and after heat treatment. The optical properties of the sample are in reflection (Rc) on the side of the layer (under 2°) and for the colorimetric data (illuminant D65 under 10°) also in reflection:

|   | Rc | a* | b* | Δa* | Δb* | ΔE* |
|---|---|---|---|---|---|---|
| 1 | 32.8 | −2.5 | 8.9 | | | |
| 1' | 33.2 | −2.5 | 9.0 | 0 | 0.1 | 1.2 |
| 2 | 29.2 | −2.1 | −6.4 | | | |
| 2' | 29.6 | −2.1 | −6.5 | 0 | 0.1 | 0.3 |

EXAMPLES 3 AND 3'

The samples comprise a set of three layers. Starting from the glass these are a mixed titanium zirconium oxide layer (50% by weight of titanium oxide, 46% of zirconium oxide, the rest being mainly yttrium oxide), a titanium oxide layer deposited from a ceramic cathode (TXO) and a mixed titanium zirconium oxide layer (same composition as the first). The respective thicknesses are, in Å: 200, 50, 400.

The first layer TZO is not strictly speaking a layer intended to reduce the diffusion even though it partly plays this role. It also operates as a layer having a relatively high index.

As previously, the mechanical, chemical and "haze" properties are satisfactory.

The optical properties of these samples are listed in the table below:

|   | Rc | a* | b* | Δa* | Δb* | ΔE* |
|---|---|---|---|---|---|---|
| 3 | 31.6 | −2.3 | 4.0 | | | |
| 3' | 32.1 | −2.3 | 3.3 | 0 | −0.7 | 0.8 |

EXAMPLES 4, 4', 5, 5', 6 AND 6'

Similar tests are carried out on samples comprising a layer of silica ($SiO_2$) as a barrier against the diffusion from the glass, a layer of titanium oxide deposited from a ceramic cathode (TXO) and a mixed titanium zirconium oxide (TZO) layer deposited from a ceramic cathode of these oxides (same composition as previously).

The thicknesses of these layers are respectively, in Å:

|   | $SiO_2$ | TXO | TZO |
|---|---|---|---|
| 4 | 200 | 200 | 200 |
| 5 | 400 | 100 | 300 |
| 6 | 100 | 300 | 300 |

The mechanical, chemical and "haze" properties are satisfactory.

The optical properties of these samples are listed in the table below:

|   | Rc | a* | b* | Δa* | Δb* | ΔE* |
|---|---|---|---|---|---|---|
| 4 | 29.3 | −2.0 | −8.1 | | | |
| 4' | 29.4 | −2.0 | −8.7 | 0 | −0.6 | 0.6 |
| 5 | 28.7 | −2.2 | −8.1 | | | |
| 5' | 27.3 | −2.0 | −9.1 | 0.2 | −1 | 1.6 |
| 6 | 33.5 | −2.6 | 3.0 | | | |
| 6' | 34.9 | −2.4 | 0.4 | 0.2 | −2.6 | 2.9 |

EXAMPLES 7, 7', 8, 8', 9 AND 9'

For these tests, the layer opposing diffusion is again a layer of tin. The high-index layer is this time constituted of a mixed titanium niobium oxide (TNO), deposited from ceramic cathodes. The layer is formed of 50% by weight of each of the oxides. The surface layer is again a mixed titanium zirconium oxide layer as in the preceding examples.

The thicknesses of these layers are respectively, in Å:

|   | $SnO_2$ | TNO | TZO |
|---|---|---|---|
| 7 | 150 | 430 | 25 |
| 8 | 150 | 430 | 50 |
| 9 | 150 | 430 | 75 |

The mechanical, chemical and "haze" properties are satisfactory.

The optical properties of these samples are listed in the table below:

|   | Rc | a* | b* | Δa* | Δb* | ΔE* |
|---|---|---|---|---|---|---|
| 7 | 27.7 | −2.1 | −7.4 | | | |
| 7' | 30.4 | −1.9 | −8.9 | 0.2 | −1.4 | 2.8 |
| 8 | 28.8 | −2.2 | −6.6 | | | |
| 8' | 32 | −2.0 | −8.3 | 0.2 | −1.7 | 3.3 |
| 9 | 29.4 | −2.2 | −6.0 | | | |
| 9' | 32.6 | −2.0 | −7.5 | 0.2 | −1.5 | 3.2 |

These tests show that the outer layer of TZO may be relatively thin in order to retain the mechanical properties and chemical resistance properties, as long as the subjacent high-index layer (TNO) is thick enough to produce the necessary reflection.

The invention claimed is:

1. A glazing, comprising at least two layers deposited by vacuum sputtering, said at least two layers comprising:
   a high-refractive index layer comprising a metal oxide, a suboxide, a nitride or an oxynitride having a refractive index which is not less than 2.2; and
   superposed directly or indirectly on the high-refractive index layer, a mixed-oxide layer comprising a mixed oxide of titanium and of at least one other metal, such that a proportion by weight of titanium oxide is not less than 40% and not greater than 95%,
   wherein:
   a thickness of the high-refractive index layer and of the mixed-oxide layer is such that, on a resulting sheet of clear "float" glass having a thickness of 4 mm, a reflection is at least 20% and a light transmission is at least 60%.

2. The glazing of in claim 1, wherein the mixed-oxide layer comprises a mixed oxide of titanium and of at least one element selected from the group consisting of Al, Zr, Hf, V, Ta, Nb, Mn, Fe, Co, Ni, Cu, and Si.

3. The glazing of claim 1, wherein the high-refractive index layer and the mixed-oxide layer are such that, applied to a sheet of clear "float" glass having a thickness of 4 mm, an absorption of a resulting coated sheet is less than 20% of an incident light.

4. The glazing of claim 1, wherein the mixed-oxide layer has a thickness between 25 and 900 Å.

5. The glazing of claim 1, wherein the at least two layers satisfy tests of resistance to condensation, to salt spray and to acidity as defined in the standard EN 1096-2.

6. The glazing of claim 1, wherein a color of reflection in a CIE system is such that under illuminant D and under the solid angle of 10° relative to a normal to the glazing, $a^* \leq 0$ and $b^* \leq 6$.

7. The glazing of claim 1, wherein a measured haze does not exceed 2% when the glazing is subjected to a heat treatment of at least 550° C. and for 5 minutes.

8. The glazing of claim 1, wherein the mixed-oxide layer is a mixed oxide of titanium and zirconium, such that a proportion by weight of zirconium oxide is between 25% and 60%.

9. The glazing of claim 1, wherein a refractive index of the mixed-oxide layer is lower than a refractive index of the high-refractive index.

10. The glazing of claim 9, wherein the high refractive-index layer comprises a layer of stoichiometric or non-stoichiometric titanium oxide or of titanium oxynitride with a low nitrogen content (N/O) of less than 10%.

11. The glazing of claim 1, further comprising, positioned between a glass sheet and the high-refractive index layer and the mixed-oxide layer, at least one tin-containing layer comprising tin oxide.

12. The glazing of claim 11, wherein the tin-containing layer comprises tin oxide and zinc oxide, and at least 30% by weight of the tin-containing layer comprises tin oxide.

13. The glazing of claim 12, wherein the tin-containing layer has a thickness which is not greater than 1.2 times a combined thickness of the high-refractive index layer and the mixed-oxide layer.

14. The glazing of claim 1, wherein the mixed-oxide layer is covered with a protective layer for protection against abrasion, composed of carbon deposited by sputtering, or with a polymer layer.

15. The glazing of claim 14, wherein the protective layer is removed by subjecting to a heat treatment of the bending/toughening type.

16. The glazing of claim 1, comprising a coated glass sheet that is colored in the bulk with a dominant wavelength in reflection $\lambda_m$ under illuminant D65 and a 2° solid angle of between 475 and 600 nm.

17. The glazing of claim 1, wherein the at least two layers exhibit a mechanical and/or chemical resistance comparable to a layer produced by pyrolysis and suitable for obtaining products having the same type of optical properties.

18. The glazing of claim 1, wherein the glazing does not include any infrared reflecting metal layers.

19. A glazing, comprising:
   a substrate comprising glass or an organic polymer; and
   a high reflection coating consisting essentially of:
      a high-refractive index layer deposited by vacuum sputtering comprising a metal oxide, a suboxide, a nitride or an oxynitride having a refractive index which is not less than 2.2; and
      superposed directly on the high-refractive index layer, a mixed-oxide layer comprising a mixed oxide of titanium and of at least one other metal, such that a proportion by weight of titanium oxide is not less than 40% and not greater than 95%,
   wherein the glazing has a light transmission of at least 60%, and
   wherein when the high reflection coating is applied to a clear glass substrate with a thickness of 4 mm, the glazing has a reflection of at least 20%.

20. A glazing, comprising:
   a substrate comprising glass or an organic polymer; and
   a high reflection coating consisting of the following layers, starting from the substrate:
      an optional protective layer for blocking diffusion of constituents of the substrate;
      a high-refractive index layer deposited by vacuum sputtering comprising a metal oxide, a suboxide, a nitride or an oxynitride having a refractive index which is not less than 2.2; and
      superposed directly on the high-refractive index layer, a mixed-oxide layer comprising a mixed oxide of titanium and of at least one other metal, such that a proportion by weight of titanium oxide is not less than 40% and not greater than 95%; and
      an optional protective coating deposited on the high reflection coating,
   wherein the glazing has a light transmission of at least 60%, and
   wherein when the high reflection coating is applied to a clear glass substrate with a thickness of 4 mm, the glazing has a reflection of at least 20%.

* * * * *